A. L. ARNEY.
HARROW.
APPLICATION FILED MAR. 15, 1915.
1,162,013.
Patented Nov. 30, 1915.
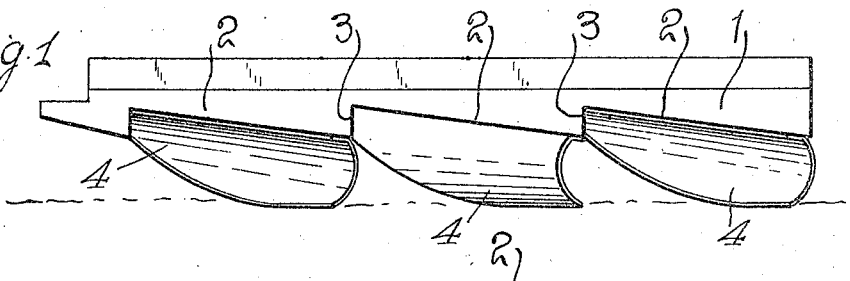
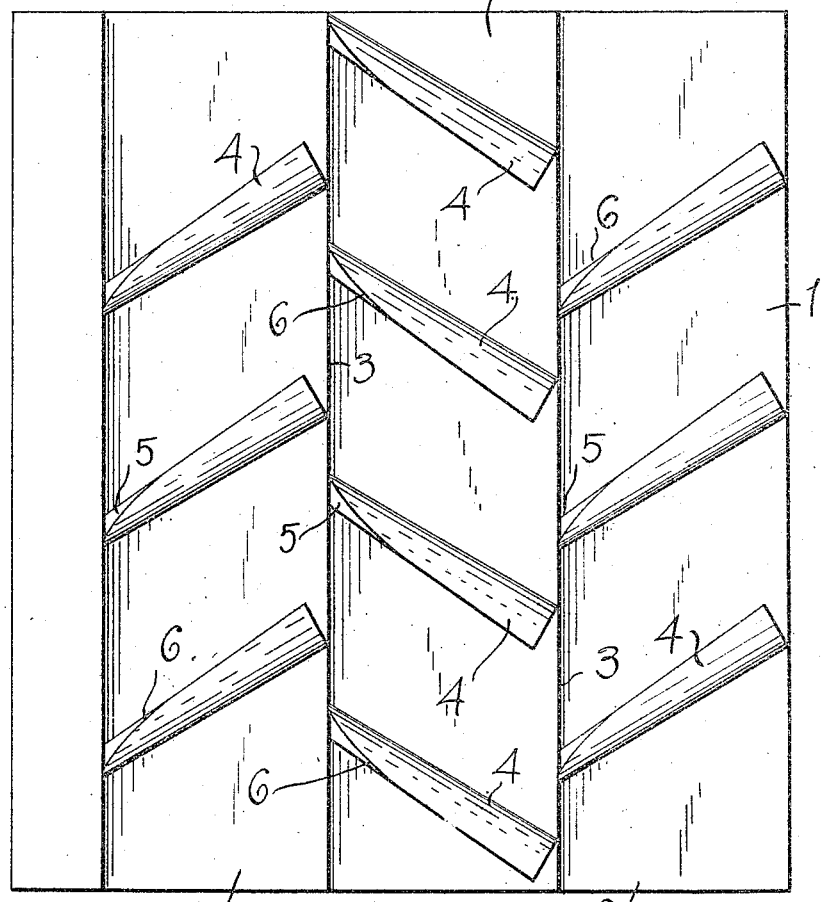
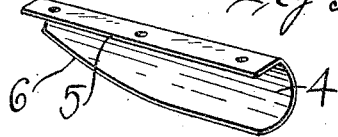
Inventor
A. L. ARNEY
Witnesses

UNITED STATES PATENT OFFICE.

ALBERT L. ARNEY, OF PETTIBONE, NORTH DAKOTA.

HARROW.

1,162,013.  Specification of Letters Patent.  Patented Nov. 30, 1915.

Application filed March 15, 1915.   Serial No. 14,533.

*To all whom it may concern:*

Be it known that I, ALBERT L. ARNEY, a citizen of the United States, residing at Pettibone, in the county of Kidder and State of North Dakota, have invented certain new and useful Improvements in Harrows, of which the following is a specification, reference being had to the accompanying drawings.

This invention relates to certain improvements in harrows and has relation more particularly to a device of this general character of a drag type; and it is an object of the invention to provide a harrow having novel and improved means to produce an even and thorough pulverization of the soil over which it is drawn.

It is also an object of my invention to produce a novel and improved harrow of this general character which serves to effectively destroy weeds or the like growing in the soil with which it coacts, and it is a still further object of my invention to provide a novel and improved device of this general character whereby the soil operated upon is turned over.

The invention consists in the details of construction and in the combination and arrangement of the several parts of my improved harrow whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in side elevation of a harrow constructed in accordance with an embodiment of my invention; Fig. 2 is a bottom plan view of the device as herein disclosed; and Fig. 3 is a view in perspective, detached, of one of the blades or agitators as herein included.

As disclosed in the accompanying drawings, 1 denotes the body of my improved harrow of predetermined dimensions and configuration but preferably of rectangular form and solid or imperforate and having its under surface provided in a direction perpendicularly to its line of travel with the parallel portions 2 separated by the shoulders or steps 3, the under surface of each of said portions being disposed on an upward and forward inclination on a predetermined angle.

Secured to each of the portions 2 and in predetermined spaced relation longitudinally thereof are the blades or agitators 4 disposed transversely thereof and arranged in parallelism and directed in predetermined angles relative to the transverse diameter of the portion.

The blades or agitators 4 of adjacent portions 2 are alternately positioned and disposed in reverse directions and of substantially equal angles whereby an effective pulverization of the soil over which the device is drawn is assured and which results in the soil acted upon being left in an even or smooth condition, thus avoiding the formation of undesirable ridges. While I do not desire to be understood as limiting myself to any particular angle on which the blades or agitators 4 are disposed transversely of the portions 2, I find in practice that best results are obtained when the same are disposed on angles of substantially thirty-five degrees.

As herein disclosed, each of the blades or agitators 4 comprises an upper longitudinally disposed marginal flange 5 adapted to be suitably secured to the under face of a portion 2 while the remaining portion of the blade or agitator 4 is arcuately formed in cross section with the rear thereof substantially semicircular in form while the forward free or under marginal portion is reduced on a gradual incline, as indicated at 6, with the forward extremity of said incline terminating substantially flush with the lower edge of the adjacent or coacting shoulder 3. It is also to be particularly observed that the transverse inclination of each of the portions 2 is such as to facilitate the entrance of the blade or agitator 4 within the soil whereby the same may be employed with a maximum of efficiency. It will also be readily perceived that the formation of the blades or agitators, as herein set forth, serves to effectively turn over the soil with which it coacts in transit and that said blades or agitators also afford an effective medium for destroying weeds or other plant growths of somewhat similar character with which it may come in contact.

While I have herein disclosed my invention as comprising but a single unit, it will be readily understood that in practice any number of said units may be employed and operatively engaged one with the other in any desired manner, and it will also be appreciated that any character of draft rigging may also be employed in connection therewith.

I have purposely omitted disclosure as to the draft rigging as the same forms no part whatever of my present invention.

From the foregoing description, it is thought to be obvious that a harrow constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A device of the character described comprising a body having disposed thereacross in a direction substantially perpendicular to its path of travel parallel shoulders, the under surfaces of the portions of the body intermediate the shoulders being disposed on forward and upward inclines, and blades secured to the inclined surface of each of said portions and disposed transversely thereof on angles relative to the transverse diameters of said portions, each of said blades including a marginal flange adapted to be secured to the body, the remaining portion of the blade being disposed arcuately in a transverse plane, the rear extremity of the blade being substantially semi-circle in cross section.

2. A device of the character described comprising a body having disposed thereacross in a direction substantially perpendicular to its path of travel parallel shoulders, the under surfaces of the portions of the body intermediate the shoulders being disposed on forward and upward inclines, and blades secured to the inclined surface of each of said portions and disposed transversely thereof on angles relative to the transverse diameters of said portions, each of said blades including a marginal flange adapted to be secured to the body, the remaining portion of the blade being disposed arcuately in a transverse plane, the rear extremity of the blade being substantially semi-circular in cross section, the free longitudinal marginal portion of the blade being gradually reduced with the forward extremity of said reduced portion terminating substantially flush with the adjacent shoulder.

In testimony whereof I hereunto affix my signature in the presence of two witnesses.

ALBERT L. ARNEY.

Witnesses:
H. BERNARD,
E. N. NELSON.